(12) United States Patent
Iwasaki (10) Patent No.: US 11,110,545 B2
(45) Date of Patent: Sep. 7, 2021

(54) COOLANT SUPPLY SYSTEM FOR LASER PROCESSING HEAD AND METHOD FOR SUPPLYING COOLANT TO LASER PROCESSING HEAD (71) Applicant: AMADA HOLDINGS CO., LTD., Kanagawa (JP)

(72) Inventor: Jun Iwasaki, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 0 days.

(21) Appl. No.: 16/486,308

(22) PCT Filed: Feb. 27, 2018

(86) PCT No.: PCT/JP2018/007193
§ 371 (c)(1),
(2) Date: Aug. 15, 2019

(87) PCT Pub. No.: WO2018/163908
PCT Pub. Date: Sep. 13, 2018

(65) Prior Publication Data
US 2020/0180074 A1 Jun. 11, 2020

(30) Foreign Application Priority Data
Mar. 9, 2017 (JP) .............................. JP2017-044593

(51) Int. Cl.
B23K 26/14 (2014.01)
B23K 26/70 (2014.01)

(52) U.S. Cl.
CPC ........ B23K 26/1435 (2013.01); B23K 26/703 (2015.10)

(58) Field of Classification Search
CPC .. B23K 26/14; B23K 26/703; B23K 26/1435; H01S 3/04; H01S 3/0401; H01S 3/0402;
(Continued)

(56) References Cited

U.S. PATENT DOCUMENTS 3,806,829 A * 4/1974 Duston ................... H01S 3/092
372/38.01
2017/0279244 A1* 9/2017 Kasahara .............. H01S 3/1306

FOREIGN PATENT DOCUMENTS

JP 10-42219 5/1998
JP 11-129088 5/1999
(Continued)

OTHER PUBLICATIONS

Machine Translation of Kokubo (JP 2005-209435), performed Aug. 7, 2020 (Year: 2005).*

(Continued)

Primary Examiner — Brian W Jennison
(74) Attorney, Agent, or Firm — Greenblum & Bernstein, P.L.C.

(57) ABSTRACT

A coolant supply system includes a coolant tank for accumulating coolant generated by using deionized water, a coolant supply passage for supplying the coolant in the coolant tank to the laser processing head, an electric conductivity meter for measuring an electric conductivity of the coolant to be supplied to the laser processing head, a drainage passage capable of draining the coolant from the coolant tank, an electromagnetic valve provided on the drainage passage, and a controller that controls open/close operations of the electromagnetic valve. The controller turns the electromagnetic valve from a closed state into an open state to drain the coolant in the coolant tank through the drainage passage when a measured value of the electric conductivity meter exceeds over a preset upper limit value.

5 Claims, 5 Drawing Sheets (58) Field of Classification Search
CPC .... H01S 3/0404; H01S 3/0405; H01S 3/0407; H01S 3/041; H01S 3/042
See application file for complete search history.

(56) References Cited

FOREIGN PATENT DOCUMENTS

| | | |
|---|---|---|
| JP | 2000-52081 A | 2/2000 |
| JP | 2001-317883 | 11/2001 |
| JP | 3291097 B2 | 6/2002 |
| JP | 2002-302784 | 10/2002 |
| JP | 2005-209435 | 8/2005 |
| JP | 2013-215743 | 10/2013 |

OTHER PUBLICATIONS

Machine Translation of Mita JP 2013-215743, performed on Jan. 12, 2021 (Year: 2013).*
Official Communication issued in European Patent Office (EPO) Patent Application No. 18763349.0, dated Feb. 26, 2020.
Official Communication issued on International Bureau of WIPO Patent Application No. PCT/JP2018/007193, dated Sep. 13, 2018.
Office Action issued in Japan Counterpart Patent Appl. No. 2017-044593, dated Mar. 23, 2018, along with an English translation thereof.

* cited by examiner

COOLANT SUPPLY SYSTEM FOR LASER PROCESSING HEAD AND METHOD FOR SUPPLYING COOLANT TO LASER PROCESSING HEAD

TECHNICAL FIELD

The present invention relates to a coolant supply system for a laser processing head and a method for supplying coolant to a laser processing head.

BACKGROUND ART

A Patent Document 1 listed below discloses a machine that supplies coolant to a laser processing head in order to cool a workpiece during laser processing.

PRIOR ART DOCUMENT

Patent Document

Patent Document 1: Japanese Patent Application Publication No. 2013-215743

SUMMARY OF INVENTION

The machine disclosed in the Patent Document 1 includes a tank of the coolant. Generally, the coolant is generated by mixing deionized water and corrosion inhibitor in a predetermined proportion. Along with passage of time, an electric conductivity of the deionized water will increase quadratically for example and an electric conductivity of the corrosion inhibitor will keep a constant value as a general rule. Therefore, in a case where the coolant generated by mixing the deionized water and the corrosion inhibitor is accumulated in the tank, an electric conductivity of the coolant will increase dominantly along with passage of time.

The laser processing head in the machine disclosed in the Patent Document 1 includes a capacitance type distance sensor that measures a distance from the laser processing head to the workpiece for a tracking control. When the electric conductivity of the coolant to be injected from the laser processing head toward the workpiece exceeds over a preset upper limit value within a tolerable range, measurement accuracy of the capacitance type distance sensor may degrade and thereby the tracking control may be affected by the degradation.

Therefore, when a deactivated period of the coolant supply machine gets long, the electric conductivity of the coolant accumulated in the tank may exceed over the upper limit value within the tolerable range and thereby the tracking control may be affected in laser processing that requires the coolant.

An object of the present invention is to provide a coolant supply system for a laser processing head and a method for supplying coolant to a laser processing head that don't affect laser processing even when deactivating a coolant supply machine for a long time.

A first object of the present invention provides a coolant supply system for a laser processing head, the system comprising: a coolant tank for accumulating coolant generated by using deionized water; a coolant supply passage for supplying the coolant accumulated in the coolant tank to the laser processing head; an electric conductivity meter for measuring an electric conductivity of the coolant to be supplied to the laser processing head; a drainage passage having an electromagnetic valve and capable of draining the coolant to an outside from the coolant tank; and a controller configured to control open and close operations of the electromagnetic valve, wherein the controller is configured to turn the electromagnetic valve from a closed state into an open state to drain the coolant accumulated in the coolant tank through the drainage passage when a measured value of the electric conductivity meter exceeds over a preset upper limit value.

A second object of the present invention provides a method for supplying coolant that is generated from deionized water and accumulated in a coolant tank to a laser processing head, the method comprising: when an electric conductivity of the coolant to be supplied to the laser processing head exceeds over a preset upper limit value, stopping supplying of the coolant to the laser processing head, and draining the coolant accumulated in the coolant tank to an outside.

A third object of the present invention provides a method for supplying coolant, generated from deionized water from a deionized water tank and accumulated in a coolant tank, to a laser processing head through a pipe, the method comprising: when an electric conductivity of the coolant to be supplied to the laser processing head exceeds over a preset upper limit value, stopping supplying of the coolant to the laser processing head, and draining the coolant accumulated in the coolant tank to an outside; flowing the deionized water from the deionized tank through the coolant tank and the pipe for a preset time; and draining the deionized water in the deionized tank after the preset time has elapsed.

DESCRIPTION OF EMBODIMENTS

A coolant supply system ST (a method for supplying coolant) according to an embodiment will be described with reference to the drawings.

Figure 1:
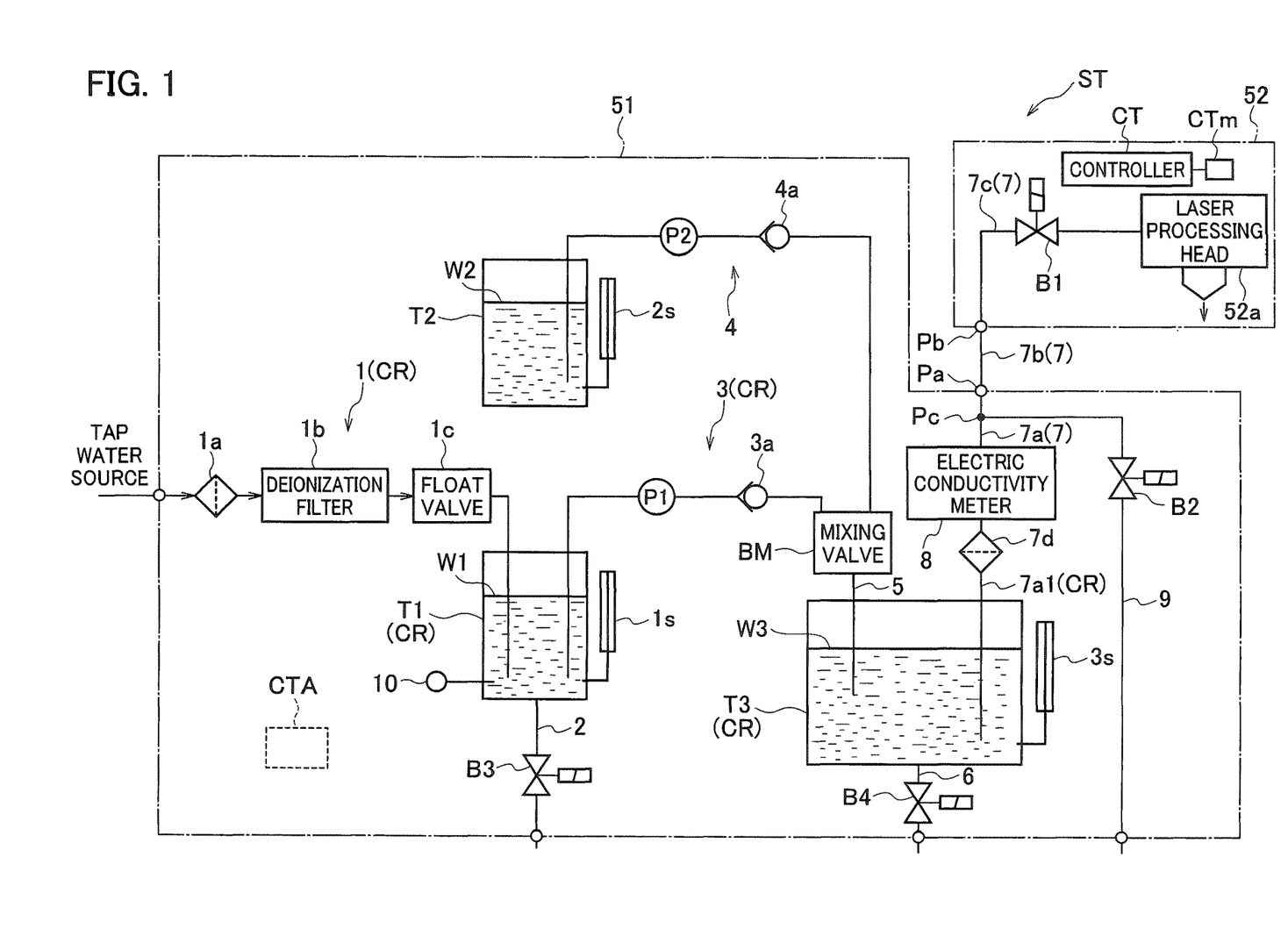
FIG. 1 is a configurational diagram of a coolant supply system ST according to an embodiment.

The coolant supply system ST includes a coolant supply machine 51 and a laser processing machine 52. The coolant supply machine 51 has a deionized water tank T1, a corrosion inhibitor tank T2 and a coolant tank T3 as tanks for accumulating liquids, and also has a mixing valve BM for mixing deionized water W1 and corrosion inhibitor W2.

The deionized water W1 generated by a deionized water generation route 1 is supplied to the deionized water tank T1, and thereby accumulated in the deionized water tank T1. Along the deionized water generation route 1, tap water from a tap water source passes through a filter 1a that filters solid mixtures, and then it is deionized at a deionization filter 1b that uses ion-exchange resin or the like, and further it is supplied to the deionized water tank T1 through a float valve 1c as the deionized water W1. The float valve 1c detects a liquid level of the deionized water W1 accumulated in the deionized water tank T1 by its float, and stops supplying of the deionized water W1 by closing its valve when the liquid level reaches a preset level. The deionized water tank T1 has a liquid level sensor 1s that detects the liquid level of the deionized water W1 accumulated therein and an electric conductivity meter 10 that measures an electric conductivity σ thereof. A drainage passage 2 is connected with a bottom of the deionized water tank T1, and an electromagnetic valve B3 that opens and closes the drainage passage 2 is provided on the drainage passage 2.

The liquid corrosion inhibitor W2 supplied by an operator or an automatic supply machine (not shown in the drawings) is accumulated in the corrosion inhibitor tank T2. The corrosion inhibitor tank T2 has a liquid level sensor 2s that detects a liquid level of the corrosion inhibitor W2 accumulated therein.

The deionized water tank T1 and the mixing valve BM are connected by a deionized water supply passage 3. A pump P1 and a check valve 3a are provided on the deionized water supply passage 3 in this order from the deionized water tank T1. The corrosion inhibitor tank T2 and the mixing valve BM are connected by a corrosion inhibitor supply passage 4. A pump P2 and a check valve 4a are provided on the corrosion inhibitor supply passage 4 in this order from the corrosion inhibitor tank T2.

The deionized water W1 accumulated in the deionized water tank T1 is supplied to the mixing valve BM through the deionized water supply passage 3 by driving the pump P1. In addition, the corrosion inhibitor W2 accumulated in the corrosion inhibitor tank T2 is supplied to the mixing valve BM through the corrosion inhibitor supply passage 4 by driving the pump P2. The deionized water W1 and the corrosion inhibitor W2 are mixed with a predetermined ratio at the mixing valve BM, and then supplied to the coolant tank T3 through a mixture supply passage 5 as coolant W3.

The coolant tank T3 has a liquid level sensor 3s that detects a liquid level of the coolant W3 accumulated therein. A drainage passage 6 is connected with a bottom of the coolant tank T3, and an electromagnetic valve B4 that opens and closes the drainage passage 6 is provided on the drainage passage 6. In addition, the coolant tank T3 also has a regulator (not shown in the drawings) that supplies air to its inside in order to keep its inner pressure at a preset value. The preset value of the inner pressure is set to a higher value (e.g. 0.3 MPa) than an atmospheric pressure.

The coolant supply machine 51 has an outlet port Pa of the coolant W3, and the outlet port Pa and the coolant tank T3 are connected by a coolant supply path 7a. On the other hand, an inlet port Pb of the coolant W3 is provided in the laser processing machine 52, and the inlet port Pb and the laser processing head 52a are connected by an internal path 7c. An electromagnetic valve B1 that opens and closes the internal path 7c is provided on the internal path 7c. The outlet port Pa and the inlet port Pb are connected by a hose or the like as an intermediary path 7b. The coolant supply path 7a, the intermediary path 7b and the internal path 7c configure a coolant supply passage 7. The coolant W3 accumulated in the coolant tank T3 is supplied to the laser processing head 52a through the coolant supply passage 7 by the inner pressure of the coolant tank T3 when the electromagnetic valve B1 is opened, and then injected toward a workpiece (not shown in the drawings).

A filter 7d and an electric conductivity meter 8 are provided on the coolant supply passage 7 in the coolant supply machine 51 in this order from a side of the coolant tank T3. In addition, a drainage passage 9 is branched from a branch portion Pc between the electric conductivity meter 8 and the outlet port Pa on the coolant supply passage 7. An electromagnetic valve B2 that opens and closes the drainage passage 9 is provided on the drainage passage 9.

Figure 2:
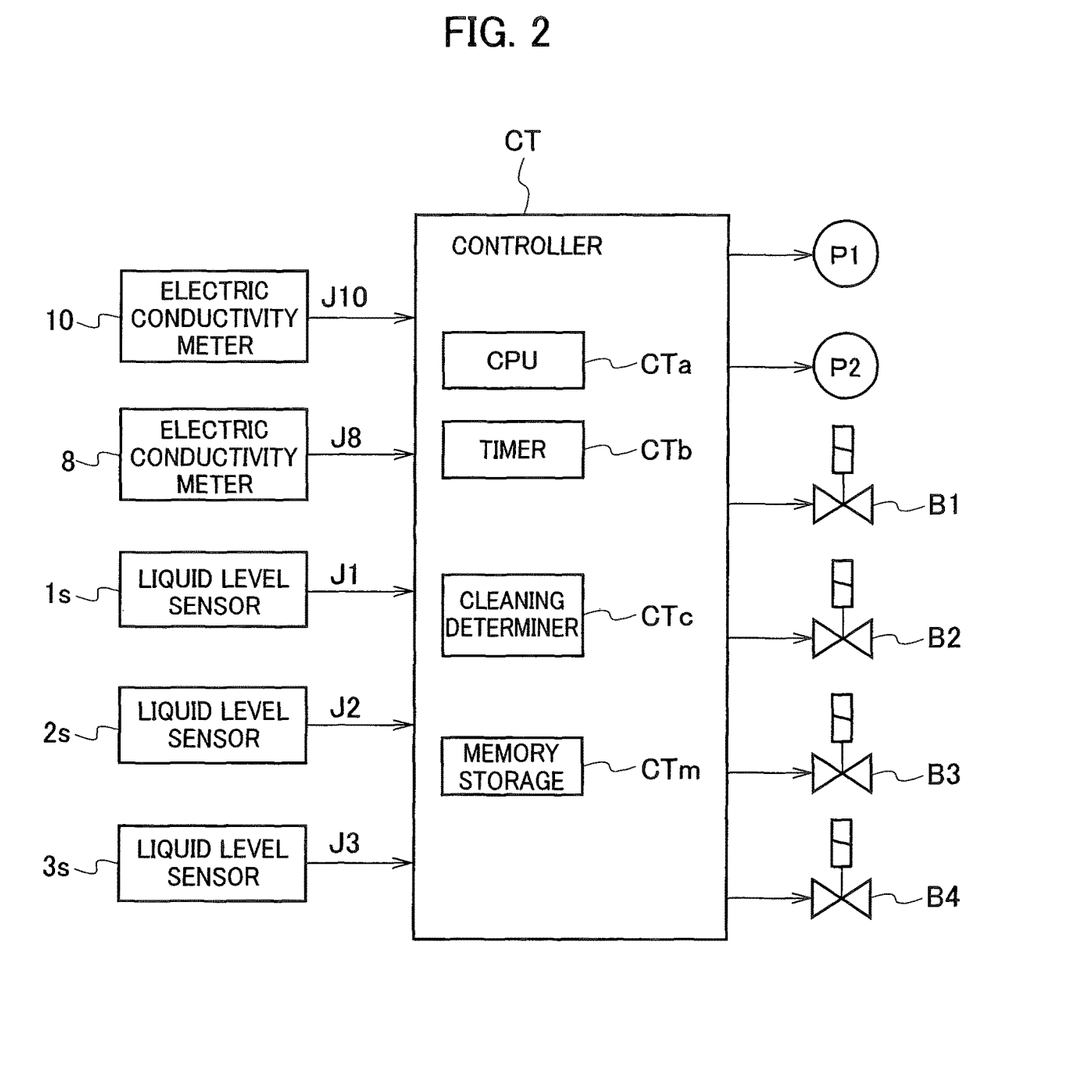
FIG. 2 is a control brock diagram of the system ST.

The laser processing machine 52 includes a controller CT that controls operations of the laser processing machine 52. As shown in FIG. 2, the controller CT includes a central processing unit (CPU) CTa, a timer CTb, a cleaning determiner CTc and a memory storage CTm.

The electric conductivity meter 8 measures an electric conductivity $\sigma$ of the coolant W3 flowing through the coolant supply passage 7, and then outputs it to the controller CT as electric conductivity information J8. The electric conductivity meter 10 measures an electric conductivity $\sigma$ of the deionized water W1 accumulated in the deionized water tank T1, and then outputs it to the controller CT as electric conductivity information J10. The liquid level sensor is outputs the detected liquid level of the deionized water W1 accumulated in the deionized water tank T1 to the controller CT as liquid level information J1. The liquid level sensor 2s outputs the detected liquid level of the corrosion inhibitor W2 accumulated in the corrosion inhibitor tank T2 to the controller CT as liquid level information J2. The liquid level sensor 3s outputs the detected liquid level of the coolant W3 accumulated in the coolant tank T3 to the controller CT as liquid level information J3.

In the above-explained coolant supply system ST, the controller CT controls operations of the pumps P1 and P2 and the electromagnetic valves B1 to B3 based on the electric conductivity information J8 and so on according to a next-explained procedure A. The procedure A is a procedure for checking the electric conductivity of the coolant.

<Procedure A>

Figure 3:
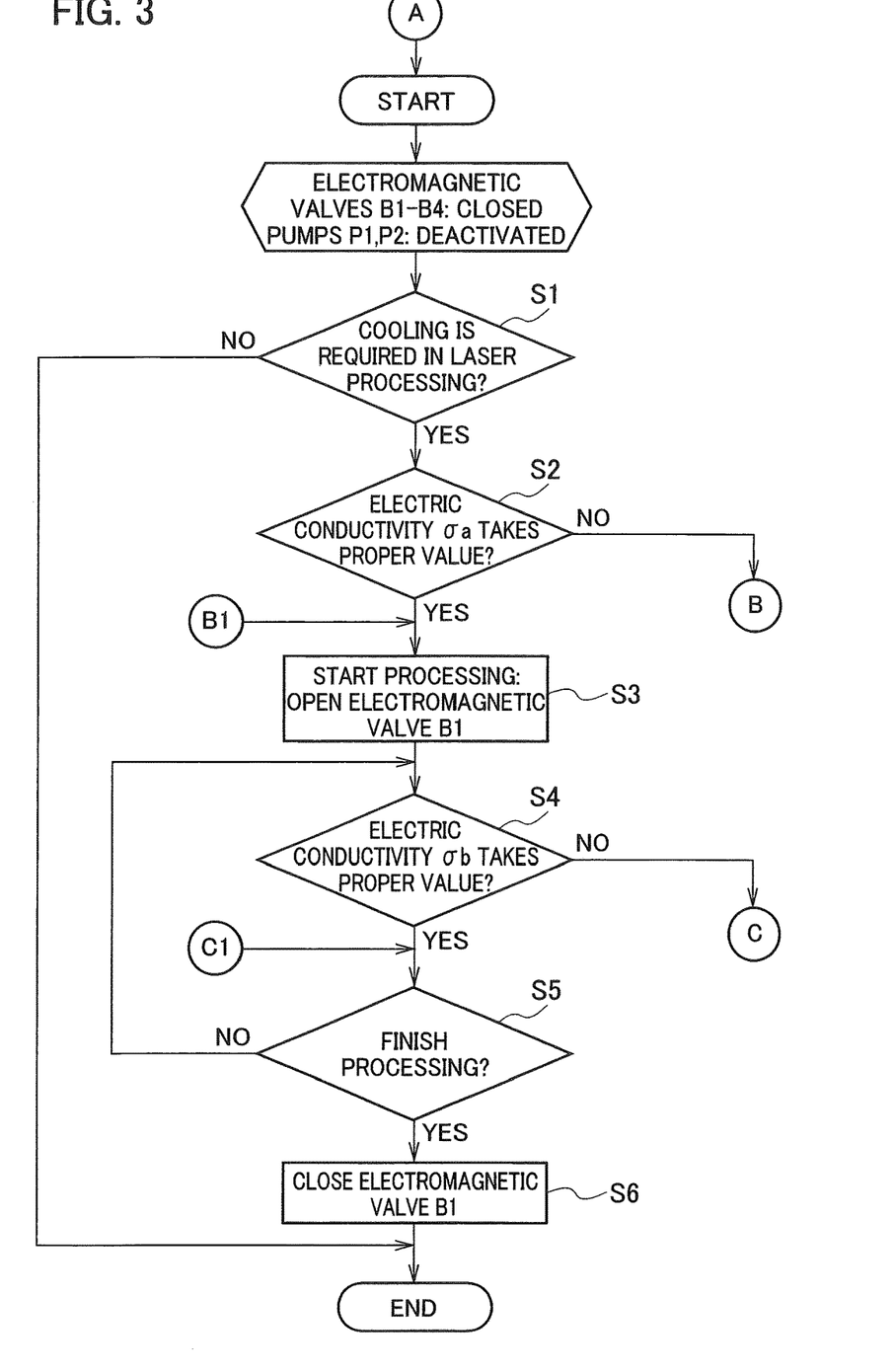
FIG. 3 is a flowchart of a procedure A in the system ST.

The procedure A done by the coolant supply system ST will be explained with reference to a flowchart shown in FIG. 3. In the procedure A, the cleaning determiner CTc determines whether or not to perform a cleaning operation based on the electric conductivity information J8. Note that an upper limit value $\sigma h1$ of the electric conductivity $\sigma$ of the coolant W3, which brings about no effect to a tracking control of the laser processing head, is preliminarily stored in the memory storage CTm.

At the beginning, the electromagnetic valves B1 to B4 are closed and the pumps P1 and P2 are deactivated in the coolant supply system ST being in its deactivated state before laser processing. The controller CT determines whether or not cooling of a workpiece by the coolant W is required in the next laser processing based on processing information preliminarily supplied from an external source (step S1).

When it is determined that the cooling of the workpiece is not required (NO in the step S1), the controller CT keeps the deactivated state of the coolant supply system ST and then finishes the procedure A. On the other hand, when it is determined that the cooling of the workpiece is required (YES in the step S1), the cleaning determiner CTc gets an initial electric conductivity $\sigma a$ that is the electric conductivity $\sigma$ of the coolant W3 at that moment based on the electric conductivity information J8 that has been input thereto, and then determines whether the electric conductivity $\sigma a$ is not more than the upper limit value $\sigma h1$ stored in the memory storage CTm (i.e. whether or not the electric conductivity $\sigma a$ takes a proper value) (step S2).

When it is determined that the electric conductivity $\sigma a$ is not more than the upper limit value $\sigma h1$ (takes a proper value) (YES in the step S2), the controller CT determines a start of laser processing and opens the electromagnetic valve B1 to inject the coolant W3 (step S3). Since the inner pressure higher than the atmospheric pressure is applied to the inside of the coolant tank T3 by the regulator, the coolant W3 is supplied to the laser processing machine 52 and then injected from the laser processing head 52a toward the workpiece.

Figure 4:
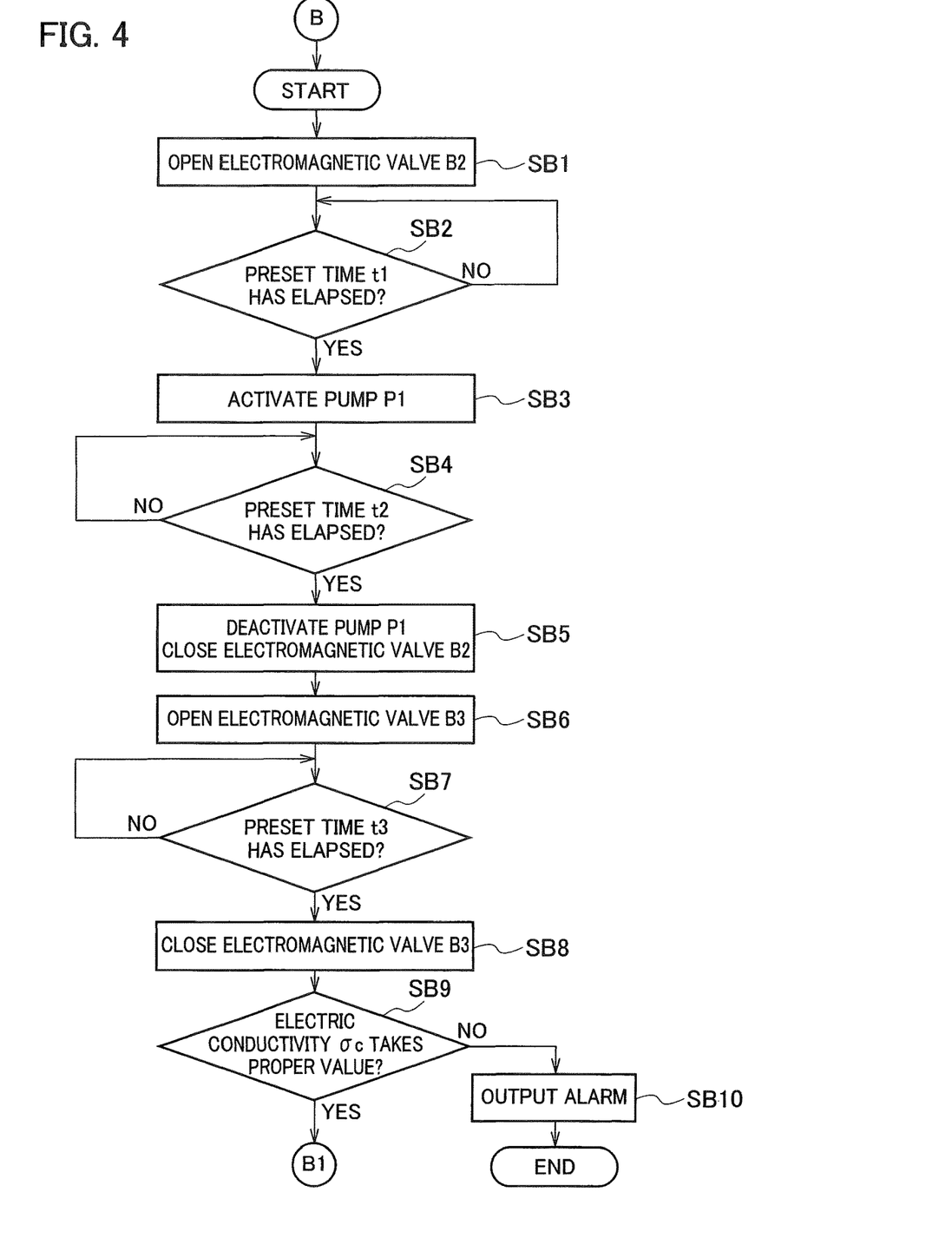
FIG. 4 is a flowchart of a procedure B in the system ST.

On the other hand, when it is determined that the electric conductivity σa is more than the upper limit value σh1 (takes an improper value) (NO in the step S2), the controller CT executes an after-explained procedure B (see FIG. 4). The procedure B is a procedure for performing cleaning before laser processing.

During supplying of the coolant W3 which is started at the step S3, the cleaning determiner CTc monitors the electric conductivity σb of the coolant W3 being supplied based on the electric conductivity information J8. Namely, it is determined whether or not the electric conductivity σh1 keeps the proper value not more than the upper limit value σh1 (step S4).

Figure 5:
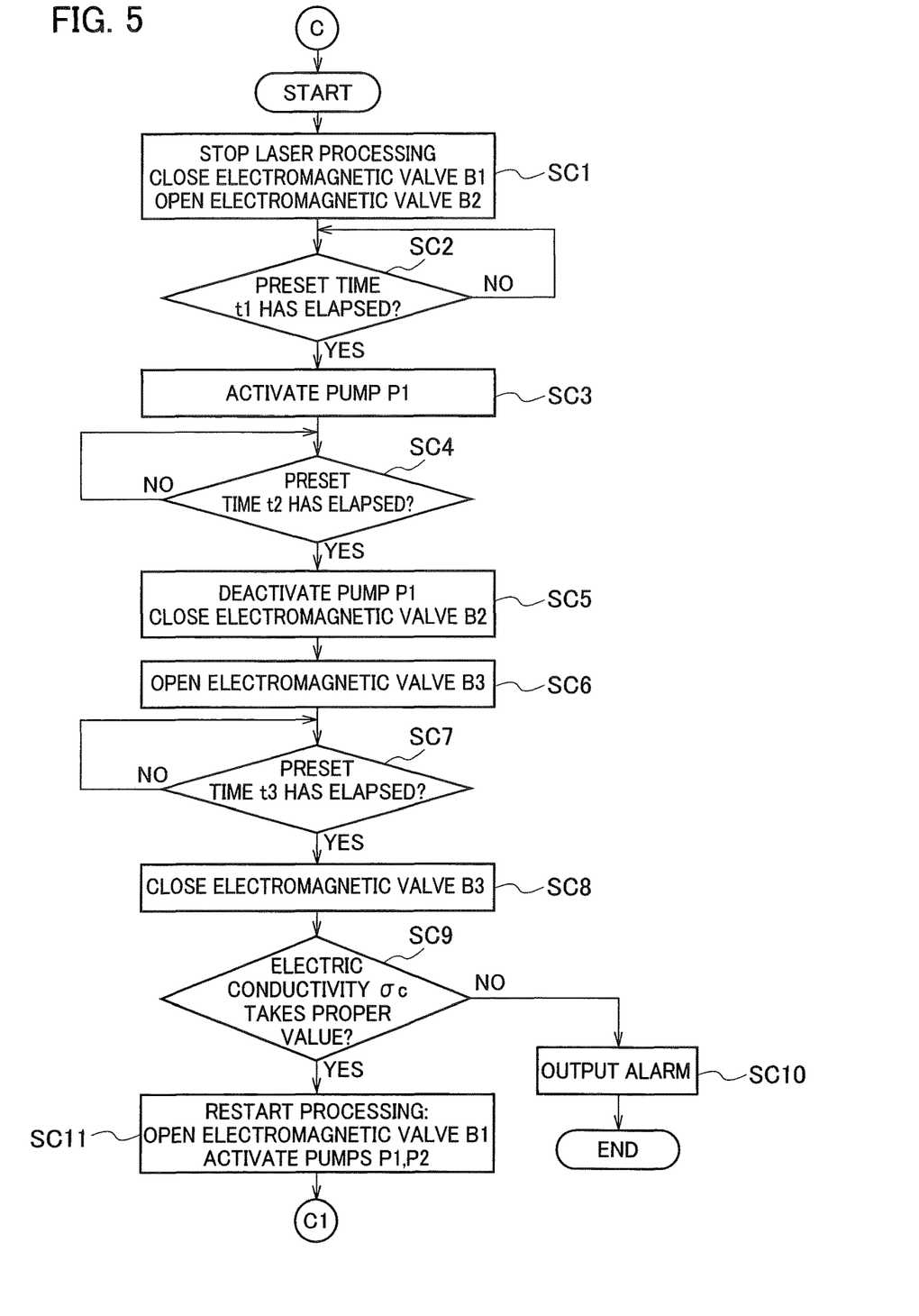
FIG. 5 is a flowchart of a procedure C in the system ST.

When it is determined that the electric conductivity σb is more than the upper limit value σh1 (takes an improper value) (NO in the step S4), the controller CT executes an after-explained procedure C (see FIG. 5). The procedure C is a procedure for performing cleaning during processing.

On the other hand, when it is determined that the electric conductivity σb is not more than the upper limit value σh1 (takes a proper value) (YES in the step S4), the controller CT determines whether or not to finish the laser processing (step S5). When continuing the laser processing (NO in the step S5), the controller CT keeps supplying of the coolant W3 while monitoring the liquid levels of the deionized water tank T1, the corrosion inhibitor tank T2 and the coolant tank T3 based on the liquid level information J1 to J3.

When detecting, based on the liquid level information J3, that the liquid level of the coolant W3 in the coolant tank T3 gets lower than a preset lower limit level, the controller CT activates the pumps P1 and P2 to supply the coolant W3 (in which the corrosion inhibitor has been mixed with a predetermined concentration) to the tank T3. Then, when the controller CT detects, based on the liquid level information J3, that the liquid level of the coolant W3 reaches a preset upper limit level, it deactivates the pumps P1 and P2. Except the midst of the execution of the procedures B and C, the controller CT executes this operation of the pumps P1 and P2 based on the liquid level information J3 regardless of opening/closing of the electromagnetic valve B1.

On the other hand, when finishing the laser processing (YES in the step S5), the controller CT closes the electromagnetic valve B1 (step S6) and thereby the procedure A is finished.

<Procedure B>

Next, the procedure B that would be done when the step S2 in the procedure A is disaffirmed will be explained with reference to a flowchart shown in FIG. 4. In the procedure B, replacement of the coolant W3 and cleaning of flow passages of the deionized water W1 and the coolant W3 are performed. The flow passages cleaned in the procedure B (a cleaning target route CR) are the deionized water generation route 1, the deionized water tank T1, the deionized water supply passage 3, the coolant tank T3 and an upstream-side path 7a1, which ends at the branch portion Pc, of the coolant supply path 7a. Of course, the drainage passage 9 is also cleaned.

At the time of the determination in the step S2 of the procedure A, the electromagnetic valves B1 to B4 are in closed states, and the pumps P1 and P2 are in deactivated states. First, the controller CT opens the electromagnetic valve B2 (step SB1). Since the inner pressure higher than the atmospheric pressure is applied to the inside of the coolant tank T3 as explained above, the coolant W3 accumulated in the coolant tank T3 is drained to the outside through the drainage passage 9.

The controller CT determines whether or not a preset time t1 has elapsed in a state where the electromagnetic valve B2 are being opened based on the measurement of the timer CTb (step SB2). The preset time t1 is a time for expectedly draining the coolant W3 accumulated in the coolant tank T3, and was preliminarily measured and then stored in the memory storage CTm.

When it is determined that the preset time t1 has elapsed (YES in the step SB2), the controller CT activates the pump P1 to flow the deionized water W1 to the mixing valve BM (step SB3). The deionized water W1 flows through the cleaning target route CR and then is drained through the drainage passage 9. Therefore, the cleaning target route CR (the insides of the tanks T1 and T3 and the inside of the pipes [the passages 1, 3, 5, 7a1 and 9]) is cleaned.

After the step SB3, the controller CT determines whether or not a preset time t2 has elapsed from the activation start of the pump P1 based on the measurement of the timer CTb (step SB4). The preset time t2 is a time for performing the cleaning adequately, and was preliminarily set based on a flow volume and a flow speed of the deionized water W1, the lengths of the pipes and so on and then stored in the memory storage CTm.

When it is determined that the preset time t2 has elapsed (YES in the step SB4), the controller CT deactivates the pump P1 and closes the electromagnetic valve B2 (step SB5). Subsequently, the electromagnetic valve B3 is opened (step SB6) to drain the entire of the deionized water W1 accumulated in the deionized water tank T1.

In a case where the preset time t2 is set as a time for using only a portion of the deionized water W1 in the deionized water tank T1 for the cleaning by the activation of the pump P1, the deionized water W1 being accumulated for a long time may be remained in the deionized tank T1. Therefore, the step SB6 is executed in order to drain the deionized water W1 remained in the deionized water tank T1. Therefore, in a case where the preset time t2 is set as a time for using the entire of the deionized water W1 in the deionized water tank T1 for the cleaning by the activation of the pump P1, the step SB6 and an after-explained step SB7 relating to the step SB6 may be omitted.

After the step SB6, the controller CT determines whether or not a preset time t3 has elapsed from the opening of the electromagnetic valve B3 based on the measurement of the timer CTb (step SB7). The preset time t3 is a time for draining the entire of the deionized water W1 accumulated in the deionized water tank T1, and was preliminarily set based on performance of the pump P1, the preset time t2, capacity of the deionized water tank T1 and so on and then stored in the memory storage CTm.

When it is determined that the preset time t3 has elapsed (YES in the step SB7), the controller CT closes the electromagnetic valve B3 (step SB8). Since the electromagnetic valve B3 is closed, a predetermined volume of the deionized water W1 is accumulated again in the deionized water tank T1. Then, the controller CT determines whether the electric conductivity σc of the deionized water W1 is not more than an upper limit value σh2 (i.e. whether or not the electric conductivity σc takes a proper value) based on the electric conductive information J10 (step SB9).

When it is determined that the electric conductivity σc is not more than the upper limit value σh2 (takes a proper value) (YES in the step SB9), the process flow transits to the step S3 of the procedure A. After the transition to the step S3, the pumps P1 and P2 are activated to accumulate a predetermined volume of the coolant W3 in the coolant tank T3 and the inner pressure of the coolant tank T3 is kept at the preset value. On the other hand, when it is determined that the electric conductivity σc is more than the upper limit value σh2 (takes an improper value) (NO in the step SB9), an alarm of an anomalous occurrence is output (step SB10) and then the procedure B is finished.

<Procedure C>

Next, the procedure C that would be done when the step S4 in the procedure A is disaffirmed will be explained with reference to a flowchart shown in FIG. 5. In the procedure C, when the electric conductivity σb of the coolant W3 being supplied during the laser processing deviates from its proper value, the laser processing is stopped and then the replacement of the coolant W3 and the cleaning of the flow passages of the deionized water W1 and the coolant W3 are performed similarly to the procedure B. The flow passages cleaned in the procedure C are the cleaning target route CR as well as in the procedure B.

At the time of the determination in the step S4 of the procedure A, the electromagnetic valve B1 is in an open state and the electromagnetic valves B2 to B4 are in closed states, and the pumps P1 and P2 are in activated states. First, the controller CT stops the laser processing, and then closes the electromagnetic valve B1 and opens the electromagnetic valve B2 (step SC1). By the step SC1, supplying of the coolant W3 to the laser processing head 52a is stopped. In addition, since the inner pressure higher than the atmospheric pressure is applied to the inside of the coolant tank T3 as explained above, the coolant W3 accumulated in the coolant tank W3 is drained to the outside through the drainage passage 9.

Hereinafter, the controller CT executes steps equivalent to the steps SB2 to SB9 of the procedure B (steps SC2 to SC9). When it is determined in the step SC9 that the electric conductivity σc is not more than the upper limit value σh2 (takes a proper value) (YES in the step SC9), the controller CT resumes the laser processing, and opens the electromagnetic valve B1 and activates the pumps P1 and P2 (step SC11). By the activation of the pumps P1 and P2, a predetermined volume of the coolant W3 is accumulated in the coolant tank T3 and the inner pressure of the coolant tank T3 is kept at the preset value. According to this, new coolant W3 is supplied to the laser processing machine 52. On the other hand, when it is determined that the electric conductivity σc is more than the upper limit value σh2 (takes an improper value) (NO in the step SC9), an alarm of an anomalous occurrence is output (step SC10) and then the procedure C is finished.

According to the present embodiment, the electric conductivity σ of the coolant W3 used for laser processing is monitored, and, when the electric conductivity σ doesn't take a proper value, the coolant W3 accumulated within the pipes and the tank at that time are drained and then replaced with new coolant W3. In addition, when replacing the coolant W3, the inside of the pipes and the tank are cleaned by flowing the deionized water W1 through them for the preset time t2. Therefore, the coolant W3 with a proper electric conductivity σ can be supplied to the laser processing machine 52 even when the coolant supply machine 51 is deactivated for a long time. As the result, tracking processing operations done by using a capacitance type sensor suffer no adverse effect.

In addition, since the inside of the cleaning target route CR is cleaned along with the replacement of the coolant W3, the flow of the coolant W3 is always kept good and the pipes can be prevented from getting clogged. Further, in the coolant system ST, the upstream-side path 7a1 (that is part of the coolant supply path 7a) positioned downstream from the coolant tank T3 is included in the cleaning target route CR. Therefore, the cleaning is done also at a closer position, on the supply passage of the coolant W3, to the laser processing machine 52, and thereby the pipes can be prevented from getting clogged more adequately.

Embodiments of the present invention are not limited to the above-explained configuration and procedures, and may be modified within a scope that doesn't deviate from the subject matter of the present invention.

For example, the controller CT of the laser processing machine 52 controls the operations of the coolant supply machine 51 in the above embodiment. However, the coolant supply machine 51 may include a controller CTA (shown by dotted lines in FIG. 1), and the controller CTA of the coolant supply machine 51 and the controller CT of the laser processing machine 52 may cooperatively control the operations of the coolant supply system ST.

In addition, the pump P2 may be activated together with the pump P1 in the step SB3 of the procedure B and in the step SC3 of the procedure C. By the activation of the pump P2, the insides of the corrosion inhibitor tank T2 and the corrosion inhibitor supply passage 4 are cleaned and the corrosion inhibitor W2 accumulated in the corrosion inhibitor tank T2 for a long time is replaced with new corrosion inhibitor W2. Therefore, the electric conductivity σc of the coolant W3 replaced by the procedure B or C can be made lower than before, and the flow of the corrosion inhibitor supply passage 4 can be always kept good and the pipes can be prevented from getting clogged.

In a single execution of the laser processing (from the start of the procedure A to the finish of the procedure A), the cleaning determiner CTc may count the number of cleaning executions (the number of disaffirmed determinations in the step S4) and, when the counted value exceeds over a preset value (e.g. 3), the controller CT may output an alarm of an anomalous occurrence and stop the laser processing and supplying of the coolant W3. According to this, in a case where a failure occurs in which a proper electric conductivity σ cannot be got at downstream from the deionized water tank T1, it can be prevented that cleaning operations are done repeatedly.

In addition, in the procedure B of the above embodiment, the coolant W3 accumulated in the coolant tank T3 is drained to the outside through the drainage passage 9 by opening the electromagnetic valve B2. However, the coolant W3 accumulated in the coolant tank T3 may be drained to the outside through the drainage passage 6 by opening the electromagnetic valve B4. Further, the deionized water tank T1 is provided in the above embodiment, but the deionized water generation route 1 and the deionized water supply passage 3 may be connected with each other without providing the deionized water tank T1.

It could be considered that increase of the electric conductivity of the deionized water W1 in the coolant W3 may cause the excess of the measured value of the electric conductivity meter 8 (the electric conductivity σ [σa, σb]) over the preset value (the electric conductivity σh1). Or, it could be also considered that a mixing ratio of the corrosion inhibitor W2 with respect to the deionized water W1 increases over a predetermined value and thereby the concentration of the corrosion inhibitor W2 increases. In this case, an increment of the electric conductivity of the coolant W3 gets proportional to an increment of the electric conductivity of the corrosion inhibitor W2. Concentration increase of the corrosion inhibitor W2 could be caused by a failure of any device on a supply side of the deionized water W1 or the corrosion inhibitor W2 (the pump P1 or P2, the mixing valve BM and so on). If the concentration increase of the corrosion inhibitor W2 is caused by such a failure, the electric conductivity of the coolant W3 cannot be improved even after the replacements of the coolant W3 in the coolant tank T3 and the deionized water W1 in the deionized water tank T1. Therefore, in a case where the measured value of the electric conductivity meter 8 still exceeds over the upper limit value even after the replacements of the coolant W3 and the deionized water W1 made due to the excess of the measured value of the electric conductivity meter 8 over the upper limit value, the controller CT may determine that it is caused by a failure of a device such as the pump P1 or P2 and the mixing valve BM, and thereby may output an alarm of an alarm of an anomalous occurrence and stop the laser processing and supplying of the coolant W3.

The entire contents of a Japanese Patent Application No. 2017-44593 (filed on Mar. 9, 2017) are incorporated herein by reference. Although the invention has been described above by reference to a certain embodiment of the invention, the invention is not limited to the embodiment described above. Scope of the present invention is determined in the context of the claims.

The invention claimed is:

1. A coolant supply system for supplying coolant to a laser processing head, the system comprising:
   a capacitance type distance sensor for measuring a distance between the laser processing head and a workpiece;
   a coolant tank for accumulating coolant generated by using deionized water;
   a coolant supply passage for supplying the coolant that accumulates in the coolant tank to the laser processing head, wherein the coolant is to be injected from the laser processing head toward the workpiece;
   an electric conductivity meter for measuring an electric conductivity of the coolant to be supplied to the laser processing head;
   a first drainage passage having an electromagnetic-first-drainage-passage valve and capable of draining the coolant to an outside of the coolant tank; and
   a controller configured to control open and close operations of the electromagnetic-first-drainage-passage valve,
   wherein the controller is configured to turn the electromagnetic-first-drainage-passage valve from a closed state into an open state to drain the coolant accumulated in the coolant tank through the first drainage passage when a measured value of the electric conductivity meter exceeds over a preset upper limit value; and
   an electromagnetic-coolant-supply valve that is provided on the coolant supply passage to open and close the coolant supply passage, wherein
   the first drainage passage is branched from the coolant supply passage between the electromagnetic-coolant-supply valve and the coolant tank,
   the controller is configured to control open and close operations of the electromagnetic-coolant-supply valve in addition to the open and close operations of the electromagnetic-first-drainage-passage valve, and
   when the measured value of the electric conductivity meter exceeds over the preset upper limit value, the controller turns the electromagnetic-coolant-supply valve from an open state into a closed state to stop supplying of the coolant to the laser processing head and turns the electromagnetic-first-drainage-passage valve from the closed state into the open state to drain the coolant accumulated in the coolant tank through the first drainage passage.

2. The coolant supply system according to claim 1, further comprising:
   a deionized water supply passage for delivering the deionized water to the coolant tank,
   wherein the controller is configured to deliver the deionized water by the deionized water supply passage while keeping the electromagnetic-first-drainage-passage valve in the open state.

3. The coolant supply system according to claim 2, further comprising:
   a deionized water tank that accumulates the deionized water and is connected with the coolant tank by the deionized water supply passage; and
   a second drainage passage that is provided with an electromagnetic-second-drainage-passage valve for opening and closing a flow passage and drains the deionized water accumulated in the deionized water tank to an outside of the deionized water tank.

4. A method for supplying coolant to a laser processing head of a laser processing machine having a capacitance type distance sensor for measuring a distance between the laser processing head and a workpiece, the method comprising:
   accumulating, in a coolant tank, the coolant that is generated from deionized water and is to be injected from the laser processing head toward the workpiece; and
   when an electric conductivity of the coolant to be supplied from the coolant tank to the laser processing head exceeds over a preset upper limit value, stopping supplying of the coolant to the laser processing head, and draining the coolant accumulated in the coolant tank, and
   the stopping supplying of the coolant to the laser processing head is performed by closing an electromagnetic-coolant-supply valve provided on a coolant supply passage through which the coolant is supplied from the coolant tank to the laser processing head, and
   the draining the coolant accumulated in the coolant tank is performed by opening an electromagnetic-drainage-passage valve provided on a drainage passage branched from the coolant supply passage between the electromagnetic-drainage-passage valve and the coolant tank.

5. The method for supplying the coolant according to claim 4, further comprising:
   when the electric conductivity of the coolant to be supplied to the laser processing head exceeds over the preset upper limit value, delivering the deionized water to the coolant tank for a preset time, and draining the deionized water delivered to an outside through the coolant tank for the preset time.

* * * * *